United States Patent [19]

Coleman et al.

[11] Patent Number: 5,602,730

[45] Date of Patent: Feb. 11, 1997

[54] RESTAURANT MANAGEMENT SYSTEM

[75] Inventors: James H. Coleman; Joe C. Davis, II; Richard L. Morgan, all of Dallas, Tex.

[73] Assignee: Altoc Corporation, Dallas, Tex.

[21] Appl. No.: 351,023

[22] Filed: Dec. 7, 1994

[51] Int. Cl.⁶ .................................................. G06F 153/00
[52] U.S. Cl. ............................................ 395/215; 395/222
[58] Field of Search .................................... 364/401, 403, 364/404, 405, 407, 478.04, 468.14, 401 R

[56] References Cited

U.S. PATENT DOCUMENTS

| | | | |
|---|---|---|---|
| 4,392,119 | 7/1983 | Price et al. ............................... | 364/401 |
| 4,415,065 | 11/1983 | Sandstedt ................................. | 364/401 |
| 4,530,067 | 7/1985 | Dorr ......................................... | 364/401 |
| 4,800,438 | 1/1989 | Yuter ....................................... | 358/254 |
| 4,935,720 | 6/1990 | Kalfoun ................................... | 364/401 |
| 5,235,509 | 8/1993 | Mueller et al. ........................... | 364/401 |
| 5,262,938 | 11/1993 | Rapoport et al. ........................ | 364/401 |
| 5,377,097 | 12/1994 | Fuyama et al. .......................... | 364/478.04 |

*Primary Examiner*—Donald E. McElheny, Jr.
*Attorney, Agent, or Firm*—Gregory M. Howison

[57] ABSTRACT

A restaurant management system (10) is provided. The restaurant management system (10) includes an inventory system (64). Also included are a supplier (54) and a user (52). Orders are sent from the user (52) to the supplier (54). The orders have associated therewith time information. Each item in the order has associated therewith an inherent minimum time until the order may be delivered. Also included is a remuneration system (60) to collect money in response to the receipt of an order. An alarm system (300) having a plurality of threshold alarms with each of the threshold alarms associated with a predetermined duration of time from the receipt of the order is also provided.

10 Claims, 13 Drawing Sheets

RESTAURANT MANAGEMENT SYSTEM

TECHNICAL FIELD OF THE INVENTION

The present invention pertains in general to a point of sale system and more particularly, relates to a hospitality operating system to provide full hospitality management operations.

BACKGROUND OF THE INVENTION

Many Point of Sales (POS) systems have been around for a long time and so have hospitality operating systems. The problem with most of these systems is that they did not provide a full and complete method to operate a hospitality environment such as a restaurant. One problem that these systems have had is that they were totally proprietary and could not be run on multiple hardware platforms. Another problem is that they were written for proprietary or obscure operating platforms and thus could not be easily modified or used with existing software or hardware. These systems also did not provide an integrated system from laying out the tables to assigning the tables to wait staff, assigning orders to persons seated at the table, and the ability to integrate multiple payment options.

These systems were also cumbersome to use since they used cryptic keyboard codes and generic graphics. These systems were merely order takers and did not provide real time integration of time and data. The previous systems did not control how orders were timed when sent to be prepared. The person placing the order still had to estimate and guess when the order should be sent and the person preparing the food had to estimate or guess when to begin the food so that they would be ready at the appropriate time.

SUMMARY OF THE INVENTION

The present invention disclosed herein comprises a restaurant management system for providing an overview of the supply of restaurant items from an inventory system to a customer. The inventory system contains items that can be delivered to the customer which are then supplied thereto by a supply system. An order system is operable to receive an order from select ones of the customers to define desired ones of the restaurant items. Each of the orders defines a predetermined number of desired ones of the restaurant items. After receiving the order, the supply system then supplies the desired items to customer after a predetermined amount of time has passed, the predetermined amount of time associated with each of the desired items. A supply control system is operable to control the time that the supply system supplies the desired items to each of the customers in accordance with the time information associated with the orders. A remuneration system is then operable to collect money for the desired items for a given order from the one of the customers originating the given order.

In another aspect of the present invention, each of the desired items has an inherent minimum time associated therewith such that the supply system cannot supply the desired item prior to expiration of that amount of time from the receipt of the order by the order system. Further, select ones of the desired items have a minimum time and a maximum time between which the restaurant items can be delivered. Whenever the time for delivery has been exceeded and the supply system has not supplied the desired restaurant items, a first alarm will be triggered. Triggering this alarm sets another threshold time, after which a second alarm can be generated.

In a further aspect of the present invention, a monitoring system is provided for monitoring the operation of the order system and the supply system. This monitoring system includes a display for displaying a representation of all customers and a status system for displaying status information for each of the displayed customer representations, this status system indicating the state of the order associated with the associated customers. The customers can be associated with a display icon which represents a table. This display icon can have multiple display modes, each display mode associated with a predetermined status condition of the display icon or table and the customers associated therewith.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
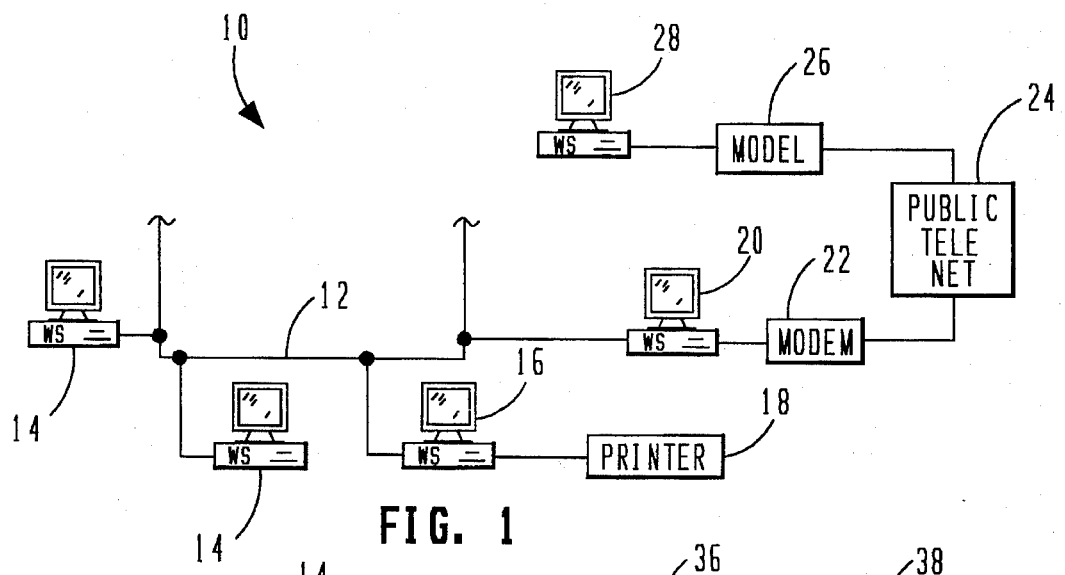
FIG. 1 illustrates a block diagram of the system of the present invention.

Referring now to FIG. 1 there is illustrated a block diagram of the system of the present invention. A hospitality point of sale system 10 is provided. A local area network (LAN) 12 is provided having multiple connections. A plurality of general work stations 14 are provided and then connected to the LAN 12. A print work station 16 is provided and is connected to the LAN 12. A printer 18 is provided and connected to the print work station 16. A communications work station 20 is also provided and is connected to the LAN 12. A modem 22 is provided and is connected to the communications work station 20. The modem 22 is also connected to the public telephone network 24. A second communications work station 28 is provided. A second modem 26 is also provided and is connected to the second communications work station 28 and the public telephone network 24.

In operation, the work stations 14, 16 and 20 are all connected to the LAN 12. Each of these work stations may operate as simply a work station or as a server for any of the other work stations. Each work station 14, 16 and 20 shares the same data through the LAN 12, allowing operation collectively or independently. The printer 18, which is connected to the work station 16, allows any of the work stations 14, 16 or 20 to print information at this location. The communications work station 20, which is attached to the modem 22, allows information from any work station 14, 16, 18 or 20 connected to the LAN 12 to be sent through the public telephone network 24 to another work station 28 through the modem 26. This allows information from any work station 14, 16 or 20 on the LAN 12 to be requested by work station 28 and sent to work station 28 through the public telephone network 24. Work station 28 may be located at any remote location having access to the public telephone network 24.

Figure 2:
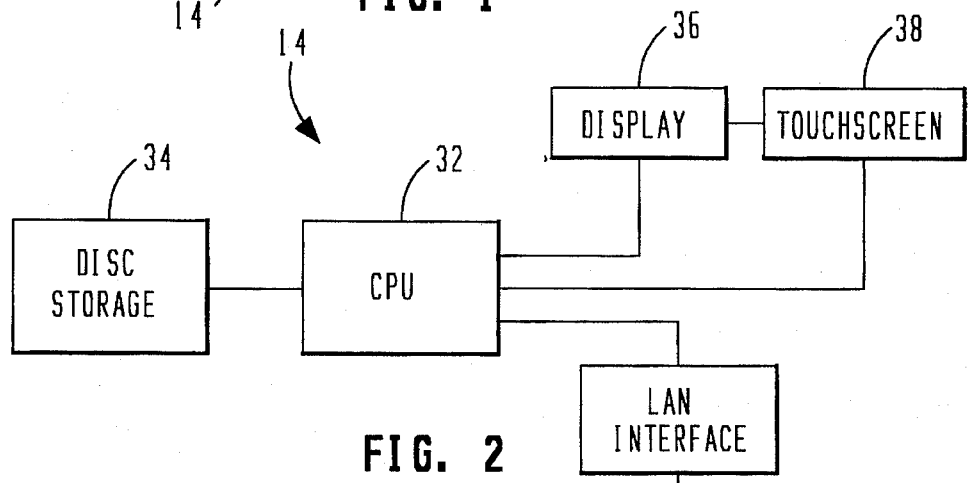
FIG. 2 illustrates a block diagram of the work station.

Referring now to FIG. 2, there is illustrated a block diagram of the work station. The work station 14 is shown. A CPU 32 is provided. The CPU 32 may be of any type which allows the use of the Microsoft Windows® operating system. A disk storage 34 is provided and is connected to the CPU 32. A LAN interface 40 is provided for connecting to the LAN 12. The LAN interface 40 is also connected to the CPU 32. A display 36 is provided and is connected to the CPU 32. A touch screen input/output device 38 is provided and is connected to the display 36 and to the CPU 32.

In operation, information is input by a user (not shown) through the touch screen input/output device 38. This is done by touching, with a person's finger, the front of display 36. Information is then transmitted to the CPU 32 where it is processed. Any instructions needed to operate the point of sale system 10 are stored on the disk storage 34. Information input through the touch screen 38 is also stored in the disk storage 34. The LAN interface 40 is connected to the CPU 32 to allow information from the disk storage 34 and the touch screen input/output device 38 to be transferred from the CPU 32 to the LAN 12. Also, a LAN interface 40 allows the CPU 32 to access information stored on other terminals (not shown).

Figure 3:
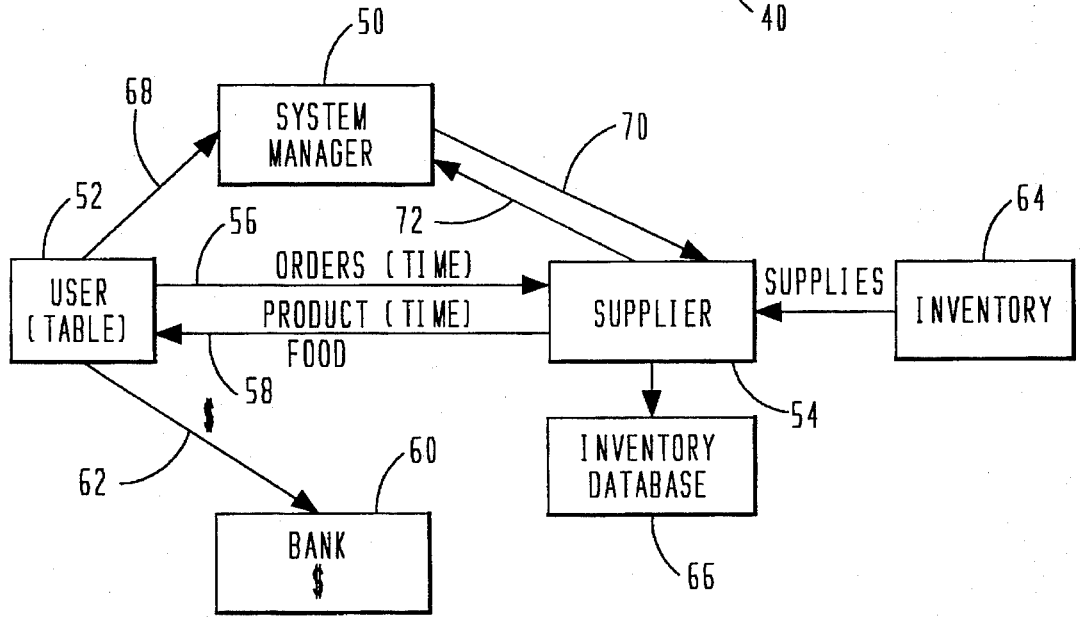
FIG. 3 illustrates a block diagram of the operating system of the hospitality point of sale system.

Referring now to FIG. 3, there is illustrated a block diagram of the operating system of the hospitality point of sale system 10. A systems manager 50 is provided. The systems manager 50 may receive input and send output. A user 52 is also provided. In this case, the user is a table at a restaurant. A supplier 54 is provided. The supplier 54 in this case is a kitchen where food is prepared in a restaurant. The user 52 is connected to the supplier 54 by an order path 56 and a product path 58. Orders from the user 52 are sent through the order path 56 to the supplier 54. Once product is prepared by the supplier 54, it is sent through the product path 58 to the user 52. A bank 60 is also provided. The bank 60 is connected to the user 52 by a one-way payment path 62, which flows from the user 52 to the bank 60. An inventory 64 is also provided. Raw materials flow from the inventory 64 to the supplier 54, as needed. An inventory database 66 is provided and is connected to the supplier 54 to receive information from the supplier 54 about inventory used and replaced. The systems manager 50 is connected to the user 52 through a user input 68 which flows one-way from the user 52 to the systems manager 50. The systems manager 50 is connected to the supplier 54 by a one-way control output 70 and a one-way feedback input 72.

In operation, the user 52 places an order for a product. The order is sent from the user 52 to the supplier 54 along the order path 56. Along with the order, time information is also sent. This time information states when an order was placed, how long the order was, and how long the individual items that make up the order will take to prepare and when the order maybe delivered to the user 52. This information is also sent to the systems manager 50 along user input 68. The systems manager 50 then decides when preparation on the items of the order should be begun, when the order should be delivered, and what inventory 64 is needed to supply the order. The results of this analysis is sent along control output 70 to supplier 54. Supplier 54 then follows the instructions from systems manager 50 and prepares the order. Systems manager 50 keeps track of the time at which the preparation of the order was begun, what items have been prepared and when the items are ready. This is done through feedback input 72. As the supplier 54 prepares the order, the inventory database 66 is updated to reflect the product used from inventory 64. Once the time has elapsed for the order to have been prepared by supplier 54, the product, which is in this case food, is delivered along the product path 58 at the given time. Once the user 52 has completed using the product, a payment is sent from the user 52 to the bank 60 along a payment path 62. Once the transaction is completed with the bank 60, the user 52 is finished.

Figure 4:
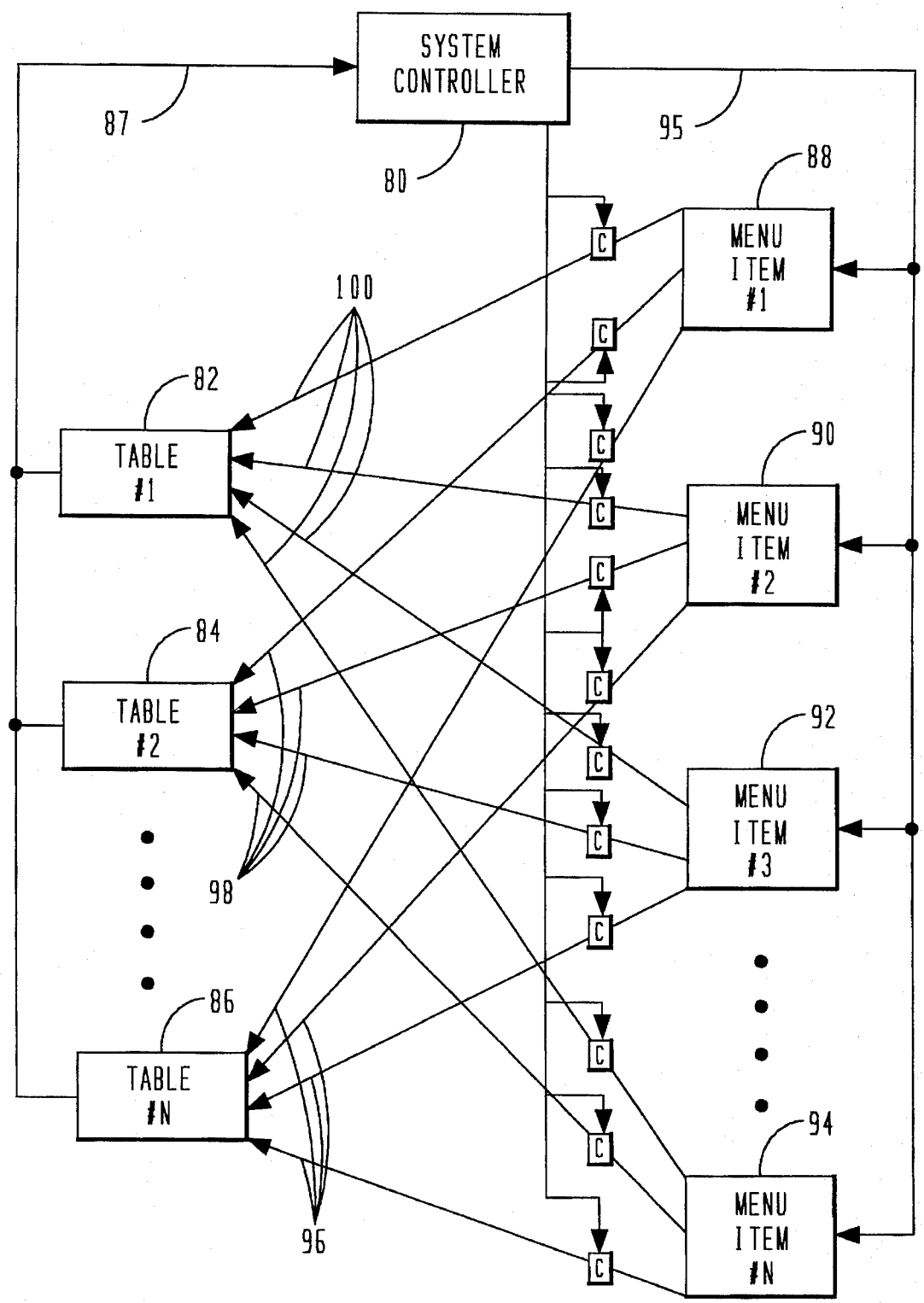
FIG. 4 illustrates a detailed block diagram of the relationship between the user and the supplier.

Referring now to FIG. 4, there is illustrated a detailed block diagram of the relationship between the user and the supplier. The system controller 80 is provided as part of the supplier 54, as shown in FIG. 3 above. Table no. 1, 82, table no. 2, 84, and table no. n, 86, representing all available tables are provided. Table no. 1, 82, table no. 2, 84 and table no. n, 86, are connected to the system controller 80 through an order path 87. Located with the supplier 54 are menu item no. 1, 88, menu item no. 2, 90, menu no. 3, 92 and menu item no. n, 94, representing all of the available menu items of the supplier 54. The system controller 80 is connected to the menu items 88, 90, 92 and 94 through a start control path 95. Each menu item 88, 90, 92 and 94 is connected to each table 82, 84 and 86 by delivery paths 96, 98 and 100. Delivery paths 96 connect each menu item 88, 90, 92 and 94 to table n, 86. Delivery paths 98 connect each menu item 88, 90, 92 and 94 to table no. 2, 84. Delivery paths 100 connect each menu item 88, 90, 92 and 94 to table no. 1, 82. The number of delivery paths 96, 98 and 100 attached to each table 82, 84 and 86 is equal to the total number of allowable menu items 88, 90, 92 and 94. Disposed along each delivery path 100, 98, and 96 from each menu item 88, 90, 92 and 94 to each table 82, 84 and 86 is a delivery controller 102. The number of delivery controllers 102 is equal to the number of tables multiplied by the number of menu items. The delivery controllers 102 are controlled by the system controller 80 and determine when a menu item 88, 90, 92 or 94 is delivered to a table 82, 84 or 86. The delivery controllers 102 are connected to the system controller 80 by means of a delivery control path 104.

In operation, a person at a table 82, 84 or 86 places an order for food and/or beverage. The order is transmitted along order path 87 from the respective table 82, 84 or 86 to the system controller 80 of supplier 54. The system controller 80 processes the order and determines the start time for the preparation of each item ordered and the delivery time for each item ordered. Then, at the appropriate time, the system controller 80 sends a message along start control path 95 to begin preparation of each menu item 88, 90, 92 or 94 ordered. When the item ordered is ready for delivery, the system controller 80 instructs the appropriate delivery controller 102 to deliver the appropriate menu item 88, 90, 92 or 94 to the table 82, 84 or 86 which ordered the item along delivery paths 96, 98 or 100, respectively. When this occurs, the appropriate delivery controller 102, along appropriate delivery path 96, 98 or 100, causes the appropriate menu item 88, 90, 92 or 94 to be delivered to the table 82, 84 or 86 which ordered it.

Figure 5:
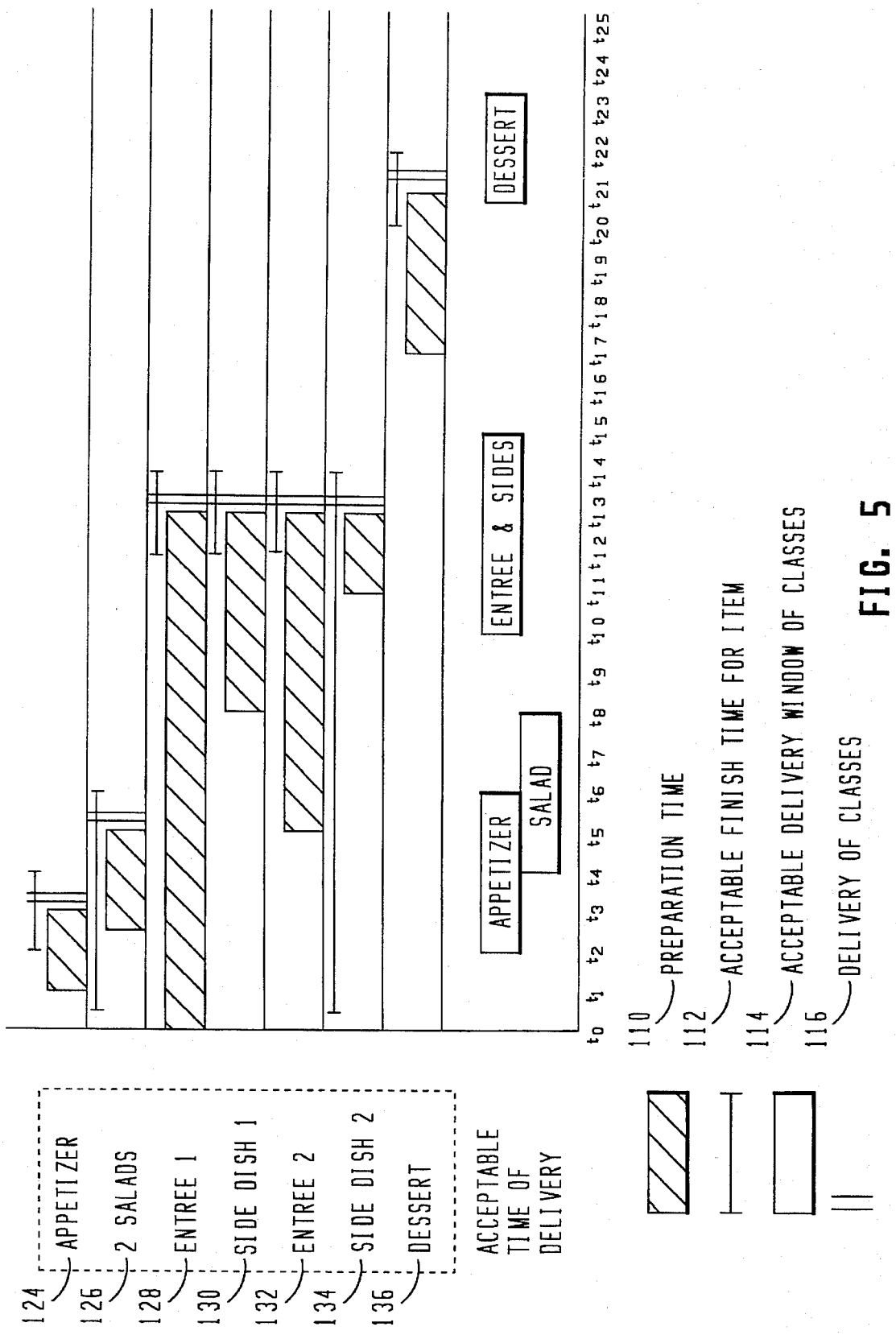
FIG. 5 illustrates a timing diagram of the operation of the interface between the user and the supplier.

Referring now to FIG. 5 there is illustrated a timing diagram of the operation of the interface between the user and the supplier. As shown above with respect to FIG. 4, persons at a table 82 place an order which is transmitted to the system controller 80 through order path 87. The system controller 80 contains information about each menu item. Information contained in the system controller 80 includes preparation time 110 per each menu item and an acceptable finish time 112 for an item. This is the time within which after an item is finished it may be delivered. The system controller 80 also contains the acceptable delivery window 114 for certain classes of menu items. These classes include appetizer, salad, entree and side dishes, and desserts. Once the order 108 has been placed, the system controller 80 calculates the delivery time 116 for each class of item based on the factors of preparation time 110 and the acceptable delivery window 114 of classes. Once the delivery time 116 for the different classes of menu items has been determined, the system controller subtracts the preparation time 110 of each item in the order 108 to determine the start time for preparation of each item. This is calculated so that each item of a class will be finished at approximately the same time, such that it may be delivered immediately after it has been prepared. This preparation time 110 may be moved forward or backwards in time such that the end of the preparation time 110 falls within the acceptable finish time 112 for the item. The system controller 80 then instructs that each menu item in the order 108 be prepared beginning at a certain calculated time. Once the delivery time for each class 106 arrives, the system controller 80 instructs the delivery controller 102 to deliver the menu items in the order 108 along the appropriate delivery paths 96, 98 or 100 to the table.

For example, order 108 consists of an appetizer 124, two salads 126, entree no. 1, 128, side dish no. 1, 130, entree no. 2, 132, side dish no. 2, 134 and dessert 136. After the order was placed, the system controller 80 determined the delivery time 116 for the appetizer 124 to be $T_3$. After this was determined, the system controller calculated the preparation start time as $T_1$ based on a preparation time 110 of two units. Since the acceptable finish time 112 for the appetizer 124 runs from $T_2$ to $T_4$ the preparation time 110 for appetizer 124 could have begun $T_0$. For the salads 126 the delivery time 116 was calculated to be $T_5$. The salads 26 have an acceptable finish time 112 running from $T_0$ to $T_6$. This means that the salads 126 could have been prepared at any time before the order was taken as long as the end of the preparation time 110 fell after $T_0$. This is the case since the salads 126 may be prepared in advance. For the next class of items, the entrees and side dishes, the system controller calculated the entrees' delivery time 116 of the entrees and sides to be $T_{13}$. This is based on the longest preparation time 110 which is for entree no. 1, 128. The system controller determined that to deliver the entrees and sides at time $T_{13}$, the preparation of entree no. 1, 128, must begin at time $T_0$. For side dish 1, 130, the preparation must begin at $T_8$ and for entree no. 2, the preparation must begin at $T_5$. For side dish no. 1, 134, the preparation could begin at any time after $T_0$, since the acceptable finish time 112 begins at time $T_0$ for side dish no. 2, 134. This is normally because side dish no. 2, 134, is a cold item which can be prepared in advance. This is true even though the preparation for side dish 2, 134, may begin as late as time $T_{11}$ for the order to be delivered at time $T_{13}$.

For the dessert 136, delivery time was determined to be $T_{21}$. For dessert 136 to be delivered at $T_{21}$, preparation of the dessert must begin at time $T_{17}$. Because the system controller 80 determines the start times for each of the menu items in order 108, the person cooking the food does not have to try to determine when to start each item, such that it finishes at the appropriate time, and that items such as an appetizer are finished at the same time as items such as an entree.

Figure 6:
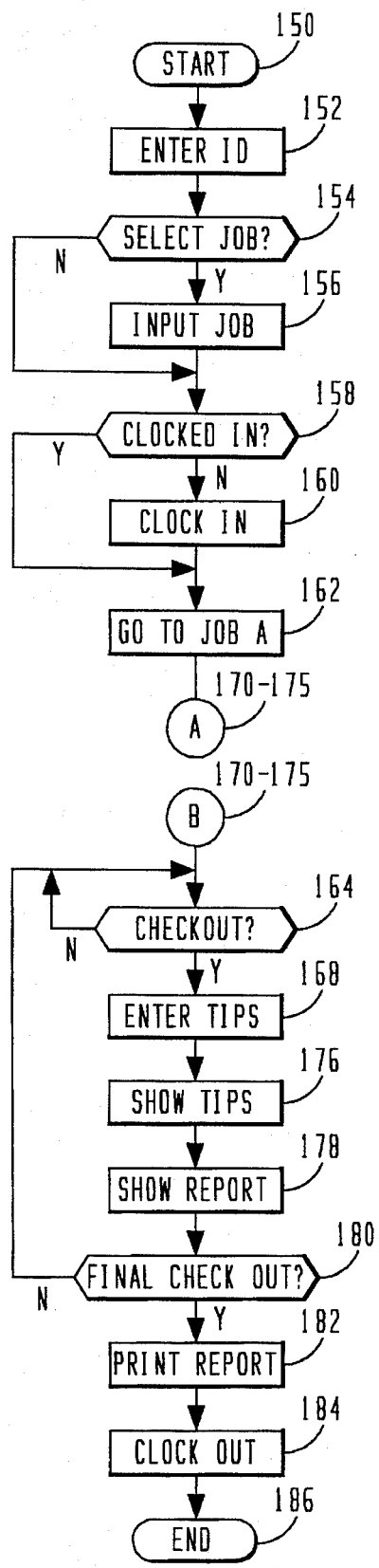
FIG. 6 illustrates a flowchart of the log in/log out procedure for the system of the present invention.

Referring now to FIG. 6, there is illustrated a flow chart of the log in/log out procedure for the system of the present invention. The routine is initiated at a start block 150. This is initiated by pressing the login screen (not shown). After the routine is initiated at start block 150, it proceeds to function block 152. At function block 152 the user inputs their ID number. If the ID number is accepted, the routine moves to decision block 154. At decision block 154 the user is asked whether they want to select a job. If the answer is yes, the routine flows along a "Y" path to function block 156 where the job title is chosen by the user. If the answer to decision block 154 is no, the routine follows along an "N" path to decision block 158. After the job is input in function block 156, the routine then also moves to decision block 158. At decision block 158, the routine checks whether the user has already clocked in. If the user has not already clocked in, the routine flows to function block 160 and allows the user to clock in. After performing function block 160, the routine then flows to function block 162 where the routine moves to the routine associated with the job of the user. If the answer in decision block 158 is yes, the routine moves along a "Y" path to function block 162 where the routine moves to the routine of the selected job of the user, 170 to 175.

When the user wants to log out of the program from their selected job 170 to 175, the program moves to decision block 164 to ask whether the user wants to check out. If the answer is no, the program moves along in an "N" path back to the job of the user, 170 to 175. If the answer is yes, the program flows along a "Y" path and prompts the user to enter their tips at function block 168. After the tips have been entered, the program moves to function block 176 where it shows the tips to the user. The program then flows to function block 178 where it shows the full report to the user. The program then flows to decision block 180 where it asks the user whether they want to perform a final checkout. If the answer is no, the program flows along an "N" path back to their respective job programs 170 to 175. If the answer is yes to decision block 180, the program flows along a "Y" path to function block 182 where a final checkout report is printed and then flows to function block 184 where the user is clocked out. After the user has clocked out in function block 184, the program flows to end block 186.

Figure 7:
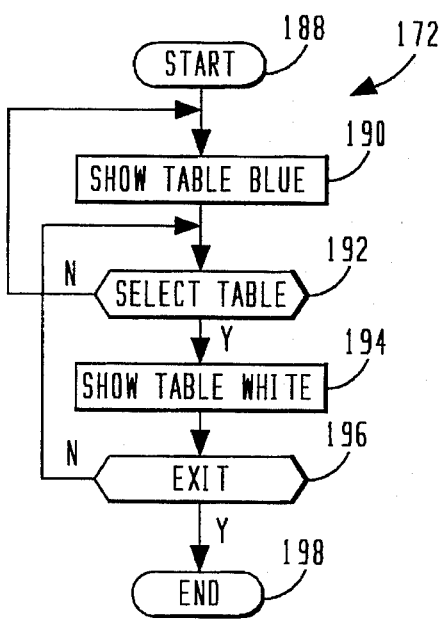
FIG. 7 illustrates a flowchart of the operation of the job of busser.

Referring now to FIG. 7, there is illustrated a flow chart of the operation of the job of busser 172. The program for the job of busser 172 begins at start block 188. It then flows to function block 190 where all the tables that need bussing are shown in blue. The program then moves to decision block 192 where the user can either select a table or not select a table. If a table is not selected, the program follows a "N" path and returns back to function block 190. If a table is selected in decision block 192, the program then flows along a "Y" path to function block 194 where the table color is changed to white indicating that it has been bussed by the busser 172. Once the table has been shown white, the program proceeds to decision block 196 where the user is asked whether they wish to exit or not. If the user wishes to exit, the program flows along a "Y" path to end block 198. If the user chooses not to exit in decision block 196, the program flows along an "N" path to decision block 192.

Figure 8:
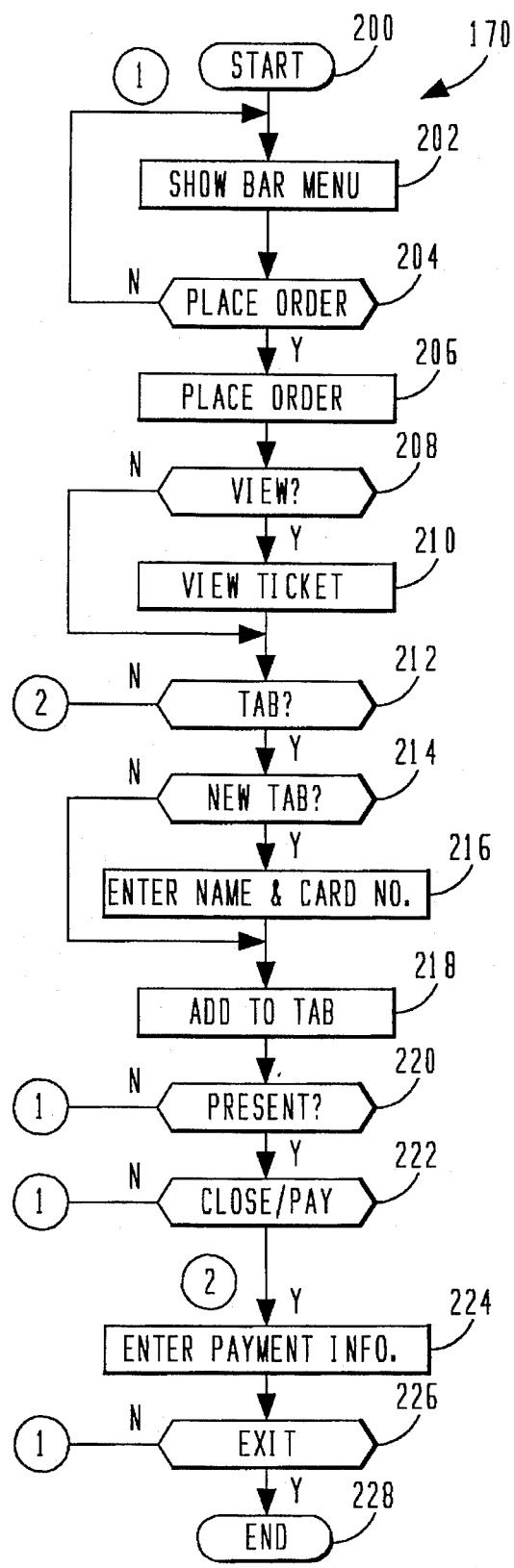
FIG. 8 illustrates a flowchart of the job of bartender.

Referring now to FIG. 8, there is illustrated a flow chart of the job of bartender 170. After logging in as shown in FIG. 6 above, the program moves to start block 200. From start block 200, the program moves to function block 202 where the bar menu is shown. After function block 202, the program moves to decision block 204 where the bartender may place an order or not place an order. If the bartender does not wish to place an order, the program moves along in a "N" path to function block 202 where the program continues to show the bar menu. If the bartender wishes to place an order, the program moves along a "Y" path to function block 206 where the bartender is allowed to place the order. After the order is placed the program moves to decision block 208 where the bartender is asked whether he wishes to view the order. If the bartender wishes to view the order, the program moves along a "Y" path to function block 210 where the full ticket is shown.

After the ticket is viewed, the program moves to decision block 212 where the bartender may input whether they want to start a tab or not. If the bartender selects that he does not wish to view the ticket in decision block 208, the program follows an "N" path to decision block 212. If the bartender, at decision block 212 states that he does want to start a tab, the program moves along a "Y" path to decision block 214. At decision block 214, the program asks whether the bartender wishes to start a new tab. If the bartender wishes to begin a new tab, the program follows the "Y" path to function block 216 where the bartender is asked to enter the name and credit card number for the new tab. After the name and card number have been entered by the bartender at function block 216, the program moves to function block 218 and adds the ticket to the tab. If, at decision block 214 the bartender does not wish to start a new tab, the program flows along an "N" path to function block 218. After adding the ticket to the tab, the program flows to decision block 220 where the bartender is asked whether he wishes to present the ticket. If the bartender does not wish to present the ticket, the program flows along an "N" path to function block 202 where the bar menu is shown. If the bartender chooses to present the ticket, the program flows along a "Y" path to decision block 222. At decision block 222 the bartender is asked whether he wishes to close and pay the ticket or tab. If the answer is no, the program flows along an "N" path to function block 202. If the bartender does wish to close and pay the tab or ticket, the program flows along a "Y" path to function block 224 where the payment information such as credit card or cash amount is entered. In decision block 212, if the bartender does wish to start a tab, the program flows along an "N" path to function block 224 where the information on the amount of cash payment is entered. Once the payment information is entered, the program flows to decision block 226 where the bartender is asked whether he wishes to exit. If the bartender answers yes, the program flows along an "N" path to function block 202 where the bar menu is shown. If the bartender does wish to exit the program, the program flows along a "Y" path to end block 228.

Figure 9:
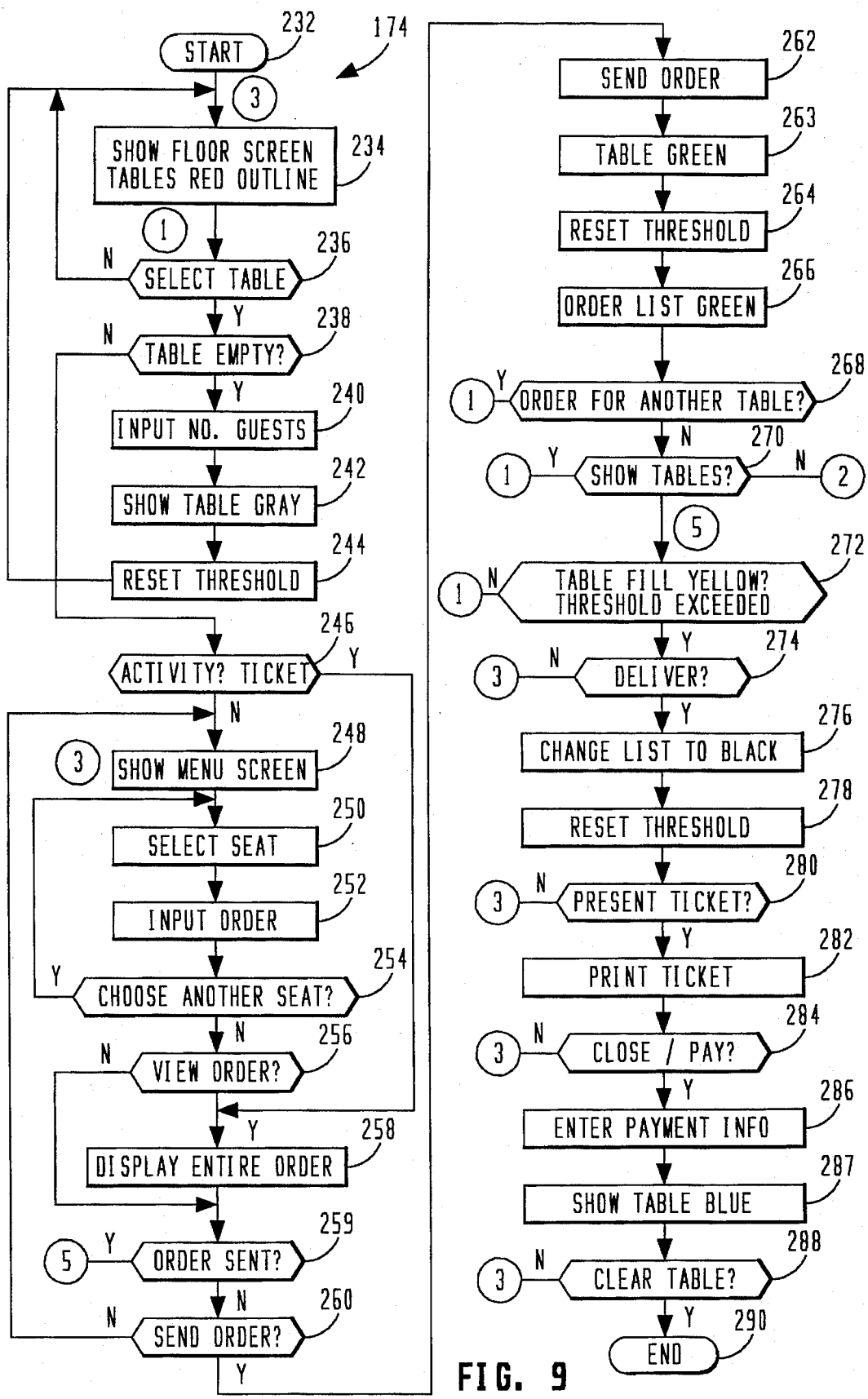
FIG. 9 illustrates a flow chart of the job of server.

Referring now to FIG. 9, there is illustrated a flow chart of the job of server 174. After the server has checked in as shown above in FIG. 6, the program moves to start block 232. From start block 232, the program moves to function block 234 where the floor layout of the restaurant is shown with the tables to which the server has access outlined in red. Once this is done, the program moves to decision block 236. At decision block 236, the server may either select a table or not select a table. If a table is not selected by the server, the program flows along an "N" path to function block 234. If the server does select a table, the program moves along a "Y" path to decision block 238. At decision block 238, the program determines whether the table is empty or whether the table has already been seated. If the table is empty, the program flows along a "Y" path to function block 240. At function block 240, the server inputs the number of guests to be seated at the table. The program then moves to function block 242 where the center of the table is shown as gray to indicate that persons have been seated at that table. The program then moves to function block 244 where a timing threshold is reset by the program. Once the threshold has been reset at function block 244, the program then moves back to function block 234. At function block 238, if the table that was selected is not empty, the program moves along an "N" path to decision block 246. Decision block 246 determines whether there is any activity or an order ticket for the selected table. If there is no activity or tickets shown for the seated table, then the program moves along an "N" path to function block 248.

At function block 248, the program shows the menu screen. Included in this menu screen are icons for ordering products and menu items and icons for selecting the chairs or seats which correspond to the person who orders the item. The program then proceeds to function block 250 where the server may select a seat to assign a menu item ordered or may select the table in the middle of the seats to show that the menu item will be shared by all persons at the table. Once a seat or all seats are selected at function block 250, the program moves to function block 252 where the server inputs the order using icons on the screen. Once the order has an input at function block 252, the program moves to decision block 254 where the server is asked whether he wishes to choose another seat. If the server chooses to order for another seat, the program follows a "Y" path and returns to function block 250 where another seat is selected. If the server does not wish to choose another seat to place an order the program follows an "N" path to decision block 256.

At decision block 256 the server is asked whether they wish to view the order. If the server answers yes, the program moves along a "Y" path to function block 258 where the program displays the entire order. If, in decision block 256, there is already activity or an order placed at the selected table, the program moves along a "Y" path to function block 258 where the entire order is displayed. Once the order has been displayed in function block 258, the program moves to decision block 260. At decision block 260, the server is asked whether they wish to send the order to the kitchen to have the order prepared. If the server does not wish to send the order to be prepared, the program follows an "N" path and returns to function block 248 where the menu screen is shown. If the server does wish to send the order to the kitchen, the program flows along a "Y" path to function block 262 where the order is sent to the kitchen and printed out so that it may be prepared.

After the order is sent, the program flows to function block 263 where the center of the table is changed from gray, as in function block 242, to green to show that an order has been placed and there is now activity at the table. The program then flows to function block 264 where the timing threshold is reset to time from the time the order was sent. The program then flows to function block 266 where the order list is listed in green whenever it is viewed by the server to show that the order has been sent to the kitchen to be prepared. The program then moves to function block 268 where the server is asked whether they wish to order for another table. If the server does wish to order for another table, the program flows along a "Y" path to decision block 236 where the server may select a table. If the server does not wish to select another table, the program flows along an "N" path to decision block 270 where the server is asked whether he wishes to show the tables. If the server does wish to show the tables, the program flows along a "Y" path to function block 236 where the tables are shown and the server may select a table. If the server does not wish to have the tables shown, the program flows along an "N" path to function block 248 where the menu screen is shown.

From function block 258, the program flows to decision block 259 where the program determines whether the order has been sent. If the order has been sent, the program flows along a "Y" path to decision block 272. If the order has not been sent, the program flows along an "N" path to decision block 260. At decision block 272, the program determines whether the table fill color is yellow meaning that a threshold has been exceeded, and in this case meaning that food is ready to be delivered. If the table fill is not yellow, meaning that the food is not ready, the program flows along an "N" path to function block 236 where a table may be selected. If the food is ready because the table fill is yellow, the program flows along a "Y" path to decision block 274. In decision block 274, the server may decide whether to deliver the order or not. If the server does not wish to deliver the menu the program flows along an "N" path to function block 234 where the table screen is shown. If the server wishes to deliver the order on the list, the program moves along a "Y" path to function block 276. At function block 276, the items which were delivered from the list are changed from a green color to a black color. After this is done the program moves to function block 278 where the timing threshold is reset. Once the timing threshold has been reset in function block 278, the program moves to decision block 280.

At function block 280 the server is asked whether they wish to present the ticket of the order. If the answer is no the program flows along an "N" path to function block 234 where the tables are shown. If the server does wish to present the ticket, the program flows along a "Y" path to function block 282 where the ticket is printed. The program then flows to decision block 284. At decision block 284, the server is asked whether they wish to close and pay the ticket. If no is chosen, the program flows along an "N" path to function block 234 where the tables are shown. If the server chooses to close and pay the check, the program flows along a "Y" path to function block 286 where the server is asked to enter the payment information such as cash or credit card and credit card number. The program then flows to function block 287 where the table is shown blue to indicate that it has not been cleared but it is empty. The program then moves to decision block 288 where the server is asked whether the table has been cleared. If the table has not been cleared, the program moves along an "N" path to function block 234 where the table screen is shown. If the table has been cleared, the program flows along a "Y" path to end block 290.

Figure 10:
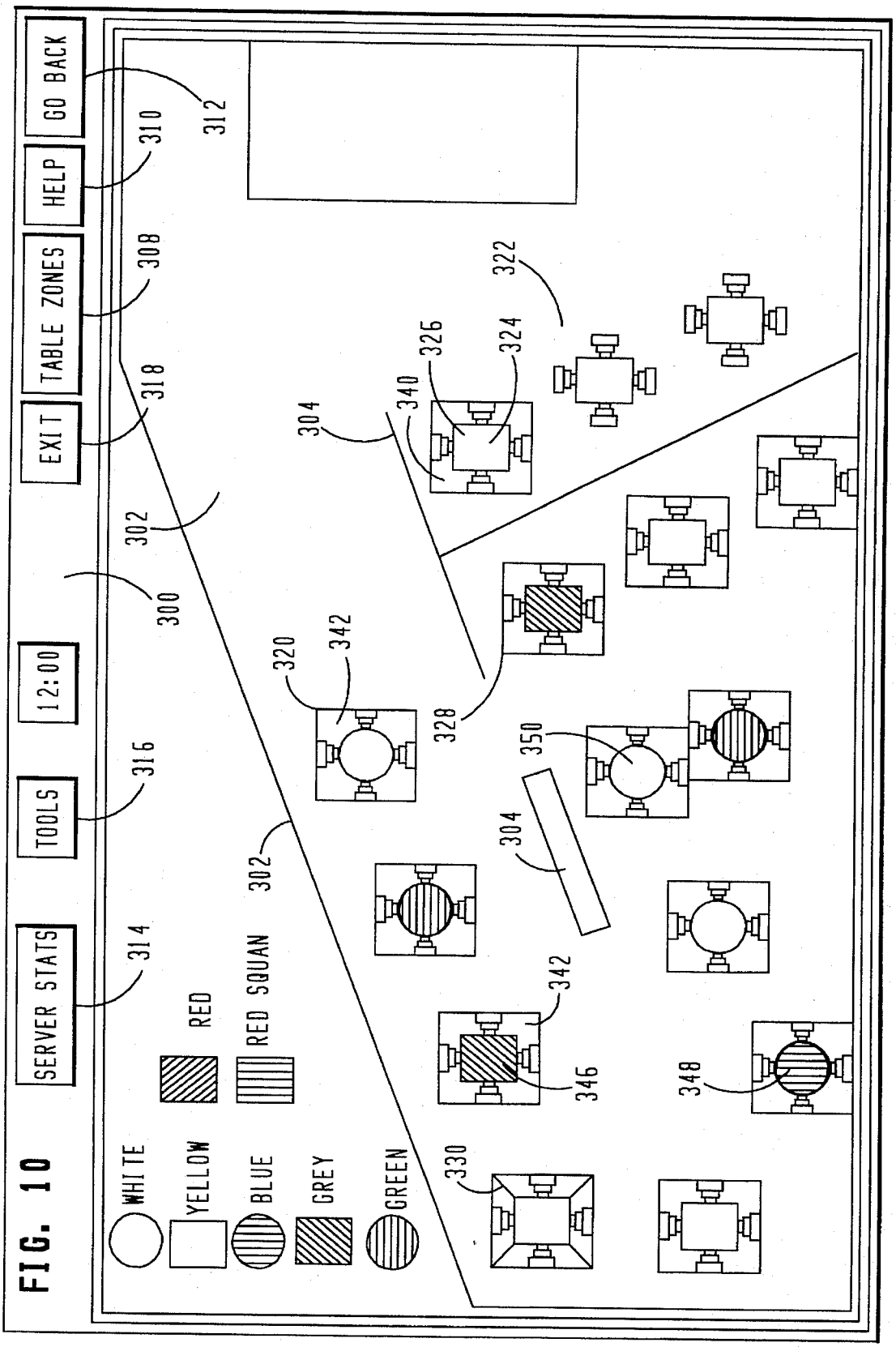
FIG. 10 illustrates a graphic diagram of the table screen.

Referring now to FIG. 10, there is illustrated a graphic diagram of the table screen 300. The table screen consists of a graphic representation of the floor plan 301 of a restaurant. The floor plan 301 consists of exterior walls 302 and interior walls or divisions 304. The floor plan 301 is customizable to the floor plan of the individual restaurant and may be scanned in by a computer scanner or may be drawn using commercially available drawing programs. The table screen 300 is displayed on a color monitor (not shown). The color monitor may be of a normal type and a mouse maybe used to navigate to the different portions of the table screen 300. Alternatively, the table screen 300 may be displayed on a touch sensitive monitor, such that a person may use their finger to touch various positions or buttons or keys on the screen to activate them. The table screen 300 is brought up after a server or other person having access to the table screen 300 has logged on as described above with respect to FIG. 6. The table screen 300 also shows the layout of the table 306 of the floor plan 301 of the restaurant.

Located on the uppermost portion of the table screen 300 are two table zone buttons 308. These buttons are used to move the table screen 300 from one part of the restaurant floor plan 301 to the next. The table zone buttons 308 move the display of the table screen 300 in either direction, to the right or to the left. A server may press either of these buttons so that the tables 306 in which they wish to access are shown on the table screen 300. Also provided on the uppermost portion of table screen 300 is a help button 310. The help button 310 allows the server to access context-sensitive help. Also located on the uppermost portion of table screen 300 is go back button 312. This allows the server to move to the tool bar screen (not shown). Also provided on the uppermost portion of the table screen 300 is a server statistics button 314. The server statistics button 314 when pressed displays the current sales statistics including the server name, their daily sales, their tax sales and their total. Another button which is located on the uppermost portion of the table screen 300 is a tools button 316. When the tools button 316 is pressed, the tools menu (not shown) is displayed. This allows the server to assign tables, void tickets, move tables, unseat tables, transfer bar tabs and change the number of persons seated at a table 306. An exit button 318 is also located on the uppermost portion of table screen 300. This button exits to the login screen to allow persons to log in to the program as described above with respect to FIG. 6.

The tables 306 to which each server has access to is indicated by a red square 320 around the tables 306. If a server does not have access to the table 306, it is indicated by not having a red square 322 around the table 306 as shown. The tables 306 are filled with a number 324 which indicates the number of the table. The color of the table 306 around the table number 324 is the table color 326. This table color 326 may be four different colors. White indicates that a table is empty and cleaned, gray indicates that persons have been seated at a table but no order has been taken, green indicates that persons are seated at the table and an order has been taken meaning the table is active and a blue color indicates that the persons have paid their ticket and left the table, but the table has not been cleared. The table color 326 thus indicates the status of the person at the table and at what point in the process of having their meal they are in. When a server wishes to seat a party at a table 306, they first must choose a table 306 where the table color 326 is white and a table 306 which has a red square 320 around it, meaning that they have access to that table 306. The server then touches a table 306 and if this table does not have any persons seated at it, a table cover display (not shown) will be displayed. If the server wishes to seat the default number at the table 306, they press OK on the cover display. The server may also increase or decrease the cover one at a time by pressing the single arrow keys, or the server may increase or decrease the covers five at a time by touching the double arrow keys. If a server does not wish to seat someone at a table 306, they may press the go back key. Once the persons have been seated at the table 306, the table color 326 turns to gray, as shown at seated table 328. If more covers than can be comfortably seated are selected for a table, the program will prompt a message stating "you have entered more covers than allowable, is this an extended table? " If the server is using two tables to seat the party, they would select "yes" and they would be asked to select another table that is used for the extended table. Once they touch another table a green X, 330 is displayed showing that the table is being used with another table and it cannot be accessed.

In addition to the table color 326 of the table 306 the table fill color 340 around the table 306 may be changed by the program. The gray fill color 342 means that the time, allotted by management, for the next operation needed to be done at the table has not passed. This means that, for example, that the food that was ordered is not yet ready or the time allotted by management for an order to be taken once a party is seated, has not passed. Once the first threshold of time has passed, the fill color 340 changes to yellow fill color 342. This means that the first threshold time allotted by management has been exceeded. For example, once a table has been seated and an order taken, the table fill color 340 turns to a yellow fill color 344 when the food preparation time has been exceeded, meaning the food is ready and the food has not been delivered. It is known that an order has been taken on a certain table 306 since the table color 326 has been changed to green 346. The table 306 is empty but needs to be cleaned when the table color 326 is blue table color 348. A table is empty and not seated when the table color 326 is white 350. When the table fill color 340 is red, that shows that the second time threshold, allotted by management, for a certain action has been exceeded. When the table fill color 340 is black, that shows that the time, allotted by management, for a certain action has been exceeded again. And when the table color 326 shows a black "X", that shows that a fourth threshold, allotted by management, for a certain action has been exceeded. Each different activity may have a different time allotted by management for it to take place. For instance, a certain time may be allotted by management for an order to be taken after a table has been seated. Also, each different food item has a different preparation time, which is the time allotted by management for the food to be delivered, so that as food is finished being prepared the table fill color 340 turns yellow to notify the server that the food needs to be delivered.

When the tools button 316 on the table screen 300 is pressed, a tools menu (not shown) is displayed. This tools menu contains buttons for various functions. Pressing the buttons brings up the various functions. The first tool is assign tables. Pressing an assigned tables button on the tools menu will show a screen identical to the table screen 300. The tables outlined in red 320 are assigned to the person whose name is displayed in the upper portion of the table screen 300. To assign additional tables 306, a server just touches the table 306 and it will be outlined in red 320. To unassign an assigned table, the server just touches a table and the table will then have no red square 322. When finished, the server pushes the go back button 312. To assign tables to other employees, the labor button (not shown) may be pressed and other servers may be chosen. Choosing the void ticket button from the tools menu will allow the server to void the entire ticket for a table 306. After touching the void ticket button, the program displays the message "void ticket for table? " The server may then touch "yes" to void the ticket or "no" to go back to the table screen 300 and select another table. The server may then touch the go back button 312 to return to the table screen 300. Seated tables 328 without an active ticket or order can be returned to an unseated state. This is done by touching the unseat table button on the tools menu. After touching the unseat table button, the server presses the seated table 328 on table screen 300 to unseat the table. To transfer a bar tab to a seated table 328, the server touches the bar transfer button on the tools menu. The server then selects from the open bar tabs which are displayed on the screen. After the bar tab has been selected, the program then displays the table screen 300. The server then selects the table 306 from the table screen 300 to which the tab will then be transferred. To change the number of covers at a table, the server presses the change cover button of the tools menu. The table screen 300 is then displayed and the server may then touch a table 306 to select a table in which to change the covers. The covers may be changed by pressing the arrow keys to increase or decrease the covers. When the server is done changing the covers, the servers may touch OK to accept the new covers. To move a table, the server selects the move table button on the tools menu. The table screen 300 is then shown. A server then touches a table 306 and "drags" it to the new location. The outline for the table will flash in its old locations until you "drop" it in place. An outline of the table 306 will follow your finger as you "drag" it. To exit the move table tool, the OK button may be pressed.

Figure 11:
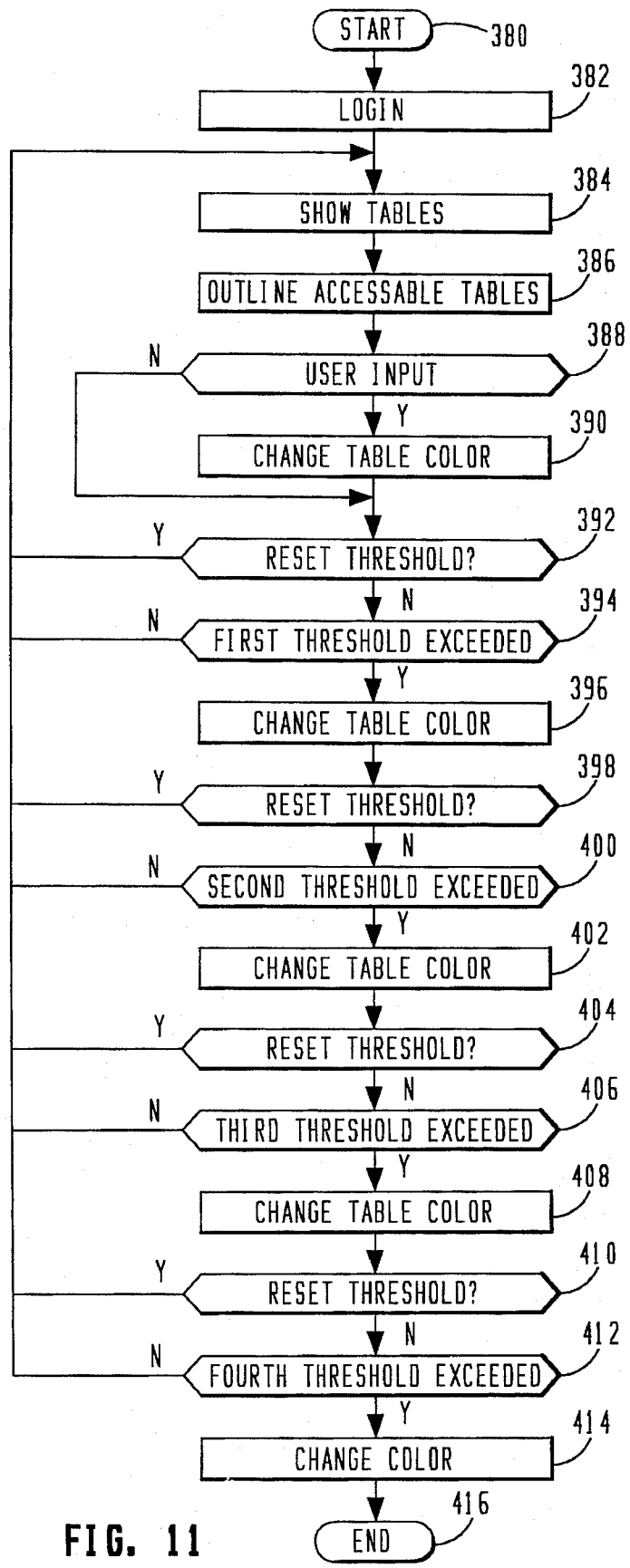
FIG. 11 illustrates a flowchart of the table display.

Referring now to FIG. 11, there is illustrated a flowchart of the table display. The program begins at the start block 380. The program then proceeds to function block 382 where the user logs in. The program then proceeds to function block 384 where the program shows the table screen 300 as described above with respect to FIG. 10. The program then proceeds to function block 386 where it outlines the tables to which the server has access with a red rectangle. The program then proceeds to decision block 388 where the program checks to see if there has been information input by the user. If information has been input by the user, the program proceeds to function block 390 and changes the table color 326 as described above with respect to FIG. 10. The program then proceeds to decision block 392 where the program checks to see if a threshold reset as described above with respect to FIG. 9 has been received. If no user input is received at decision block 388, the program then proceeds to decision block 392. If a reset threshold has been received at function block 392, the program proceeds along a "Y" path to function block 384 where the tables are shown. If no reset threshold command has been received at decision block 392, the program proceeds along an "N" path to decision block 394.

At decision block 394, the program checks to see if the first threshold has been exceeded for the last performed task at the table. If the threshold has not been exceeded, the program then follows an "N" path to function block 384 where the tables are shown. If the first threshold has been exceeded, the program flows along a "Y" path to function block 396. At function block 396, the program changes the fill color 340 as described above with respect to FIG. 10. The fill color 340 in this case is changed to yellow to indicate that a first threshold has been exceeded. The program then proceeds to decision block 398 to determine whether a reset threshold command has been received. If a reset threshold command has been received, then the program proceeds along a "Y" path to function block 384. If a reset threshold command has not been received, the program flows along an "N" path to decision block 400.

At decision block 400, the program looks to see if the second threshold has been exceeded. If the second threshold has not been exceeded, then the program follows an "N" path to function block 384. If the second threshold has been exceeded, then the program follows a "Y" path to function block 402. At function block 402, the table fill color 340 is changed to indicate that the second threshold has been exceeded. The program then flows to decision block 404 to determine whether a reset threshold command has been received. If a reset threshold command has been received, the program flows across a "Y" path to function block 384. If a reset threshold command has not been received the program flows along an "N" path to decision block 406. At decision block 406, the program determines whether the third threshold has been exceeded. If the third threshold has been exceeded, the program flows along a "N" path to function block 384. If the third threshold has been exceeded, then the program flows along a "Y" path to function block 408 where the fill color is changed to indicate that the third threshold has been exceeded. The program then flows to decision block 410 where the program determines whether a reset threshold command has been received. If a reset threshold command has been received, the program flows along a "Y" path to function block 384 where the tables are shown. If a reset threshold command has not been received, the program flows along an "N" path to decision block 412. If the fourth threshold has not been exceeded, the program flows along an "N" path to function block 384. If the fourth threshold has been exceeded, the program flows along a "Y" path to function block 414. At function block 414, the table fill color 340 is changed in this case to an "X" indicating that the fourth threshold has been exceeded. The program then flows to end block 416 where the program is ended.

Figure 12:
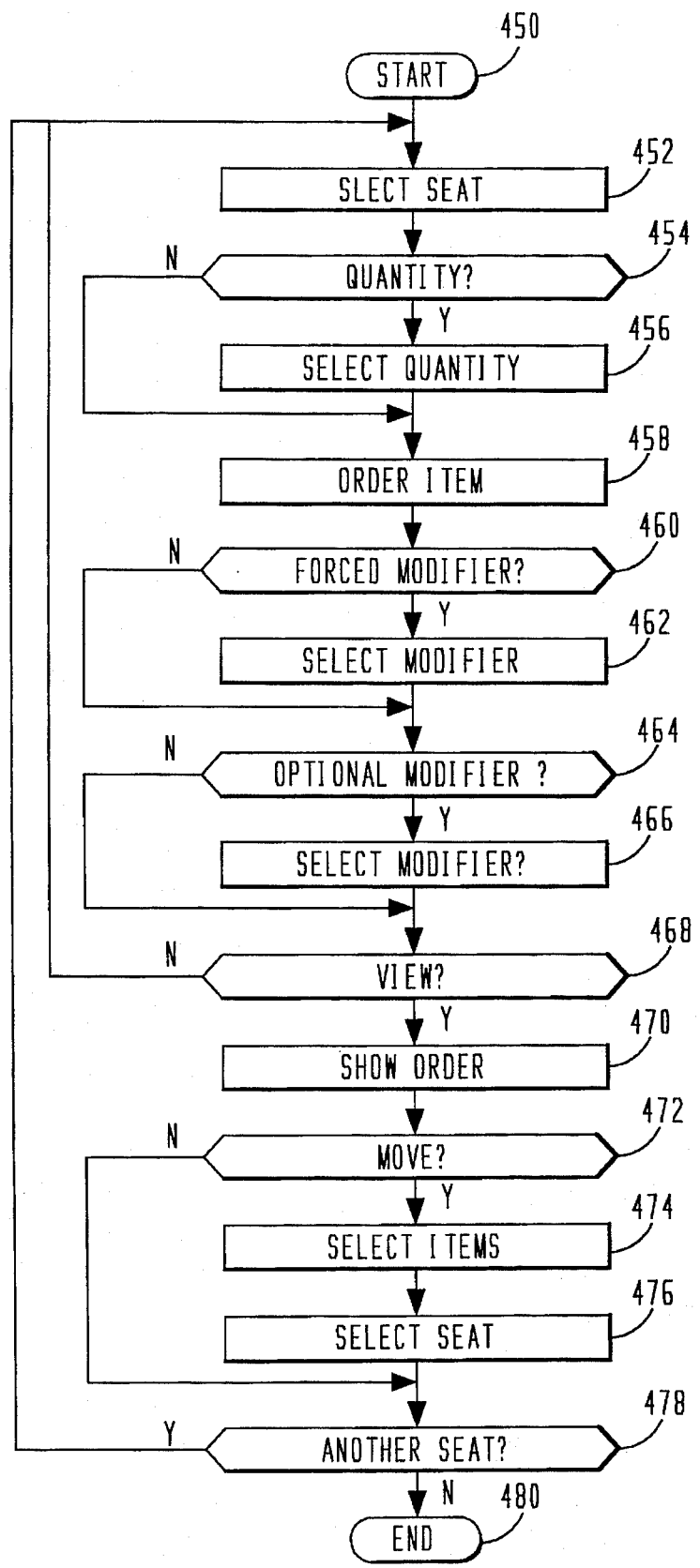
FIG. 12 illustrates a flowchart of the process of entering an order.

Referring now to FIG. 12, there is illustrated a flow chart of the process of entering an order. The program starts at start block 450 once the menu screen is shown. The program then moves to function block 452 where a seat is selected. When a seat is selected, the program then moves to decision block 454 where the server is asked whether they wish to input a quantity. If the answer is yes, the program moves to function block 456 where a quantity keypad pops up and the server may select a quantity. The program then moves to function block 458 where the server may select an order item. If the server does not wish to input a quantity at function block 454, the program then moves along an "N" path to function block 458. At function block 458, the items may be ordered by touching an icon representing the item or icons maybe touched representing alternate menus, such as those for liquor, appetizers, breakfast or drinks.

Once the item has been selected at function block 458, the program moves to decision bock 460 where the program determines whether a forced modifier is associated with the item ordered. If there is a forced modifier associated with the items ordered, the program flows along a "Y" path to function block 462 where the server is asked to select a forced modifier. The program then moves to decision block 464 where the server is asked whether they wish to associate an optional modifier or disassociate an optional modifier with an item. If a forced modifier is not associated with the item ordered in step 460, the program flows along an "N" path to decision block 464. If the server wishes to select an optional modifier at decision block 464, the program flows along a "Y" path to function block 466 where the server is asked to select or deselect the modifier. The program then moves to decision block 468 where the server is asked whether they wish to view the order. If the server does not wish to view the order, the program flows along an "N" path to function block 452. If the server does wish to view the order, the program flows along a "Y" path to function block 470 where the order is shown. The program moves to decision block 472 where the server is asked whether they wish to move any items that are shown on the order. If the server does wish to move some items, the program flows along a "Y" path to function block 474 where the server may select the items that the server wishes to move. The program then flows to decision block 478 where the server is asked whether they wish to order for another seat. If the server does wish to order for another seat, the program flows along a "Y" path to function block 452. If the server does not wish to order for another seat, the program flows along an "N" path to end block 480.

Figure 13:
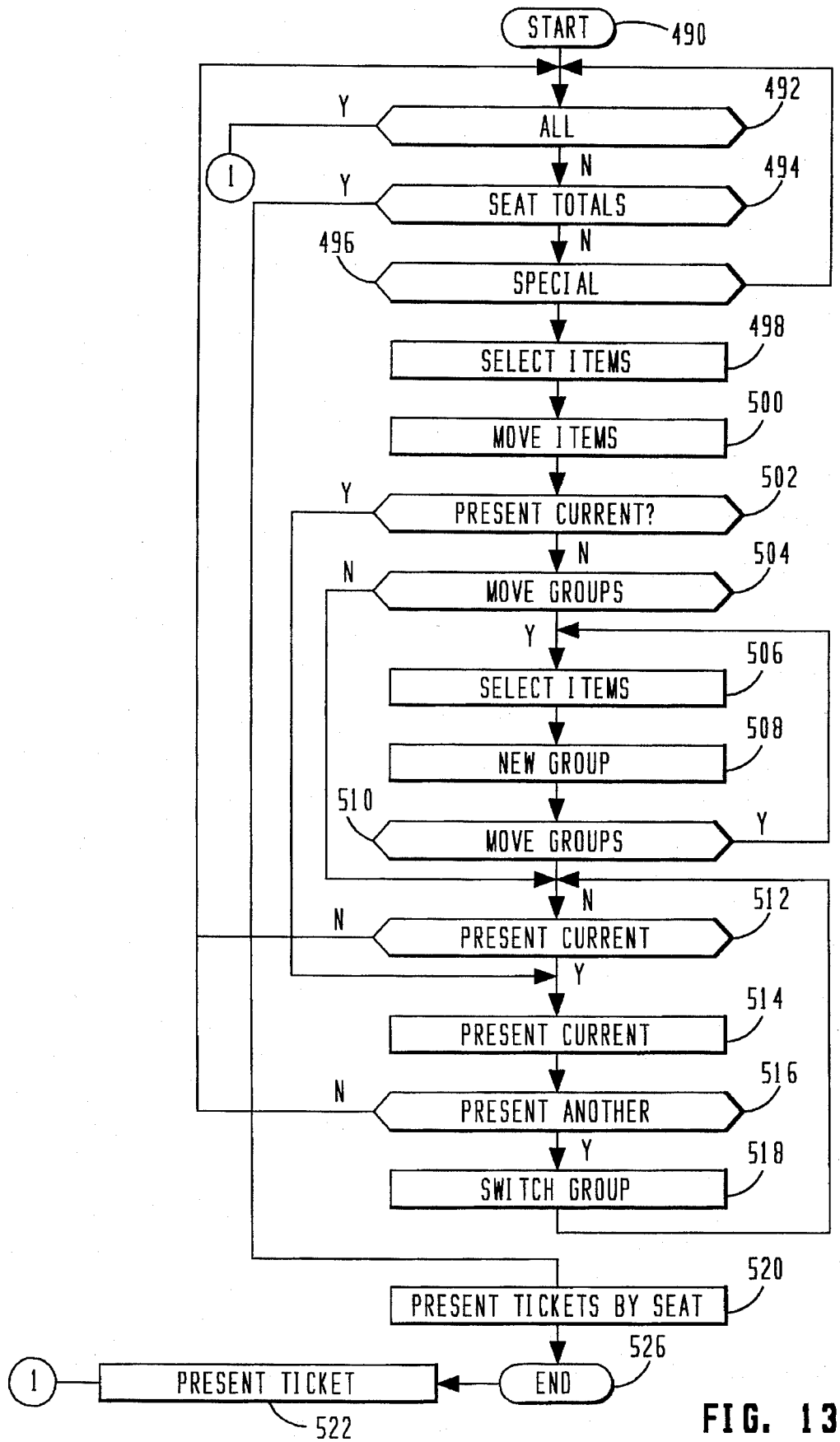
FIG. 13 illustrates a flowchart of the steps for presenting a ticket 280.

Referring now to FIG. 13, there is illustrated a flowchart of the steps for presenting a ticket 280 as described above with respect to FIG. 9. The program begins at start block 490. The program then proceeds to decision block 492 where the server is asked whether they want to present all of the ticket. If the answer is no, the program proceeds to decision block 494 where the server is asked whether they wish to present the ticket by seat totals. If the answer is no, the program proceeds to decision block 496 where the server is asked whether they wish to present the ticket in a special manner. If the server does not wish to present the ticket in a special manner, the program proceeds along an "N" path to decision block 492. If the server does wish to present the ticket in special manner, the program flows along a "Y" path to function block 498. At decision block 498, the server is asked to select the items which they wish to move to another ticket to present. The server may do this by using the select all button, the select none button or the select by seat button. The items may also be selected by using the cursor or a person's finger to touch the items to be selected.

The program then moves to function block 500 where the server either presses the move button to move the items to a group shown in the group window or the new group button to move the items selected to a new group. The program then moves to decision block 502 where the server is asked whether they wish to present the current ticket or not. If the server does not wish to present the current ticket, the program moves to decision block 504 where the server is asked whether they wish to make more groups. If the server wishes to make more groups, the program flows along a "Y" path to function block 506 where they are asked to select the items to move to the additional group. The program then flows to function block 508 where the server presses the new group key to put these selected items into a new group. The program then flows to decision block 510 where the server is asked if they wish to form more groups. If the server wishes to form more groups, the program flows along a "Y" path to function block 506. If the server does not wish to select any more groups, the program flows across an "N" path to decision block 512.

In decision block 504, if the server does not wish to select more groups, the program flows along an "N" path to decision block 512. At decision block 512 the server is asked whether he wishes to present the current ticket or not. If the server does not wish to present the current ticket, the program flows along an "N" path to decision block 492. If the server wishes to present the current ticket, the program flows along a "Y" path to function block 514 where the current ticket is printed so that it may be presented. The program then moves to decision block 516 where the server is asked whether they wish to present another ticket. If the server does not wish to present another ticket, the program flows along an "N" path to decision block 492. If the server does wish to present another ticket, the program flows along a "Y" path to function block 518 where the server is allowed to switch groups by pressing the group key.

The program then flows to decision block 512. At decision block 494, if the server wishes to present the seat totals, the program flows along a "Y" path to function block 520. At this time, the ticket is presented and subtotaled by seat number. After the ticket is presented, the program flows to end block 526. At decision block 492, if the server wishes to present the ticket for all of the items, the program flows along a "Y" path to function block 522 where the total ticket is presented. After the ticket is presented at function block 522 the program flows to end block 526.

Figure 14:
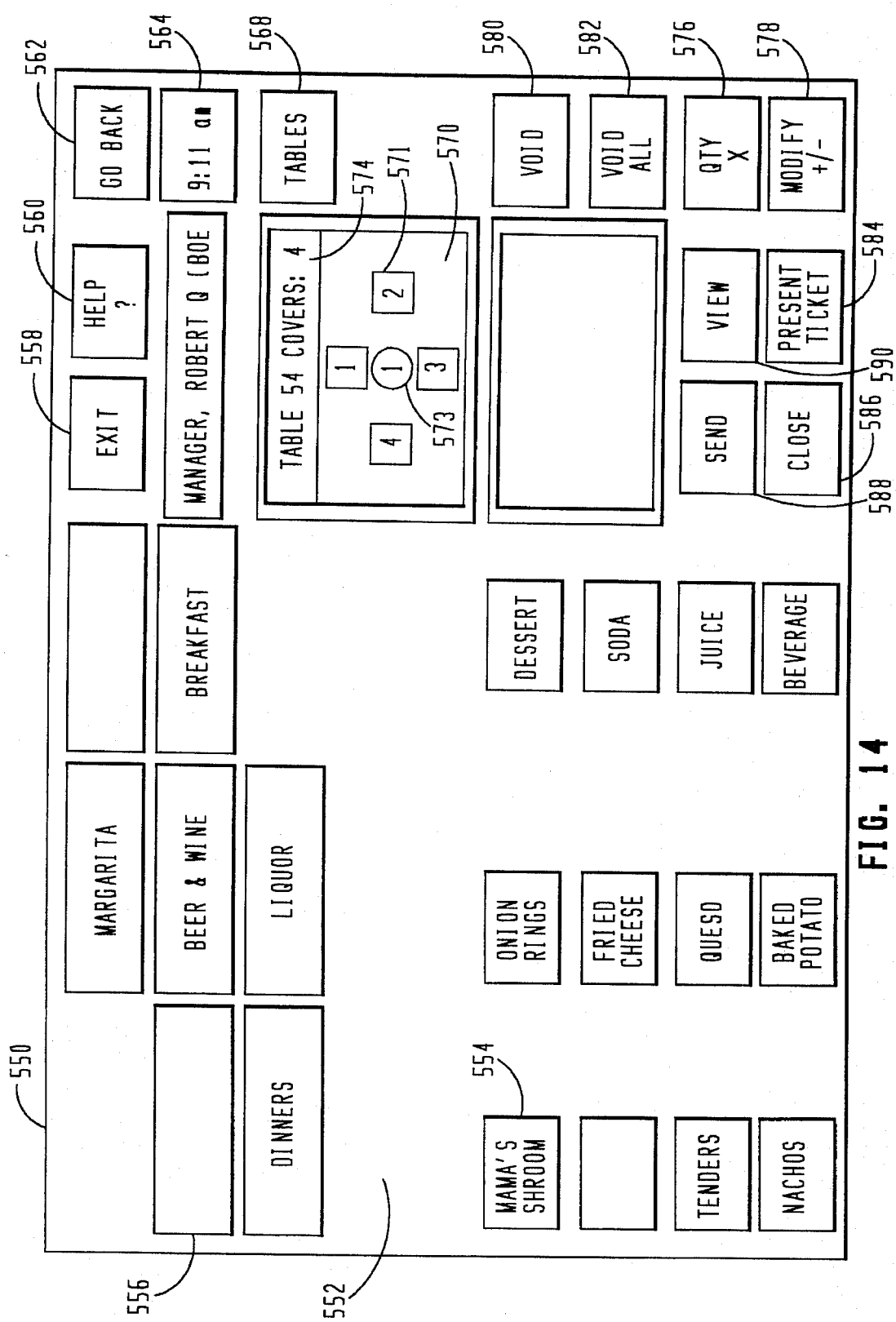
FIG. 14 illustrates a graphic diagram of the menu screen.

Referring now to FIG. 14, there is illustrated a graphic diagram of the menu screen 550. The menu screen 550 consists of an order area 552. The order area 552 contains item icons 554. The menu screen 550 also contains secondary menu icons 556. The secondary menu icons 556 bring up a secondary menu from which to choose an item. In the uppermost righthand portion of the menu screen 550, there is contained an exit button 558, a help button 560 and a go back button 562. The exit button 558 allows the user to exit so that another user may enter the program. The help button 560 pulls up context-sensitive help. The go back button 562 allows the user to go back to the table screen 300. Just under the exit button 558 is the name 566 of the person placing the order. Just under the go back button 562 is shown the time 564. Just under the time 564 is the tables button 568. The tables button 568 allows the user whose name is listed at the name 566 to list all of the tables to which they have access without going back to the table screen 300. The mini screen 550 further consists of a seat window 570. Disposed in the seat window 570 is a representation for each person seated at the table a seat button 571. There is also a table button 573 and an order window 572.

To place an order, the server presses a seat button 571. The server then selects from either an item icon 554 or a secondary menu icon 556 depending upon what the person at the seat corresponding to the chosen seat button 571 has chosen. The table represented by the seat buttons 571 and a table button 573 is shown in the table number window 574. A table may be chosen by choosing a table from the table screen 300 or by choosing from a list of tables to which the server has access after pressing the tables button 568. Once the order has been entered for one seat, the server chooses a second seat button 571 or the table button 573 and then chooses an item icon 554 or a secondary menu item icon 556. If a secondary menu icon 556 is chosen, a secondary menu comes up on the screen from which the server can choose additional menu items from additional item icons 554. If the menu item chosen has a forced modifier, the forced modifier screen will pop up, allowing the server to either select or deselect modifiers corresponding to the menu items shown.

If the person requests a modifier for their order that is not a mandatory or forced modifier, the server presses the modify button 578. A modify menu then pops up and the server may add or remove any modifiers. The modifiers that are selected will print with a "plus" or "minus" next to the item, indicating that the item selected should be added or left out of the order. There is no limit to the number of modifiers that one can select. If a person or a table wishes to order a quantity of items rather than imputing the items one by one, the server can select the quantity button 576. When this happens, a numerical keypad pops up such that the server may select a quantity before selecting a menu item.

If the server wishes to void the last item entered, the server presses the void button 580. If the server wishes to void all of the pending order, the server may press a void all button 582. Located in the lower righthand corner of the menu screen 550 is a present ticket button 584, a close button 586, a send button 588 and a view entire order button 590. The present ticket button 584 is pressed when the server wishes to present the ticket to the customer for payment as discussed above with respect to FIG. 13. The close button 586 is pressed when a customer wishes to close out their ticket and pay for their meal. This is discussed above with respect to FIG. 9. The send button 588 is used to send the order to the kitchen to have it prepared. The view entire order button 590 is used to view the entire order as discussed below with respect to FIG. 15.

Figure 15:
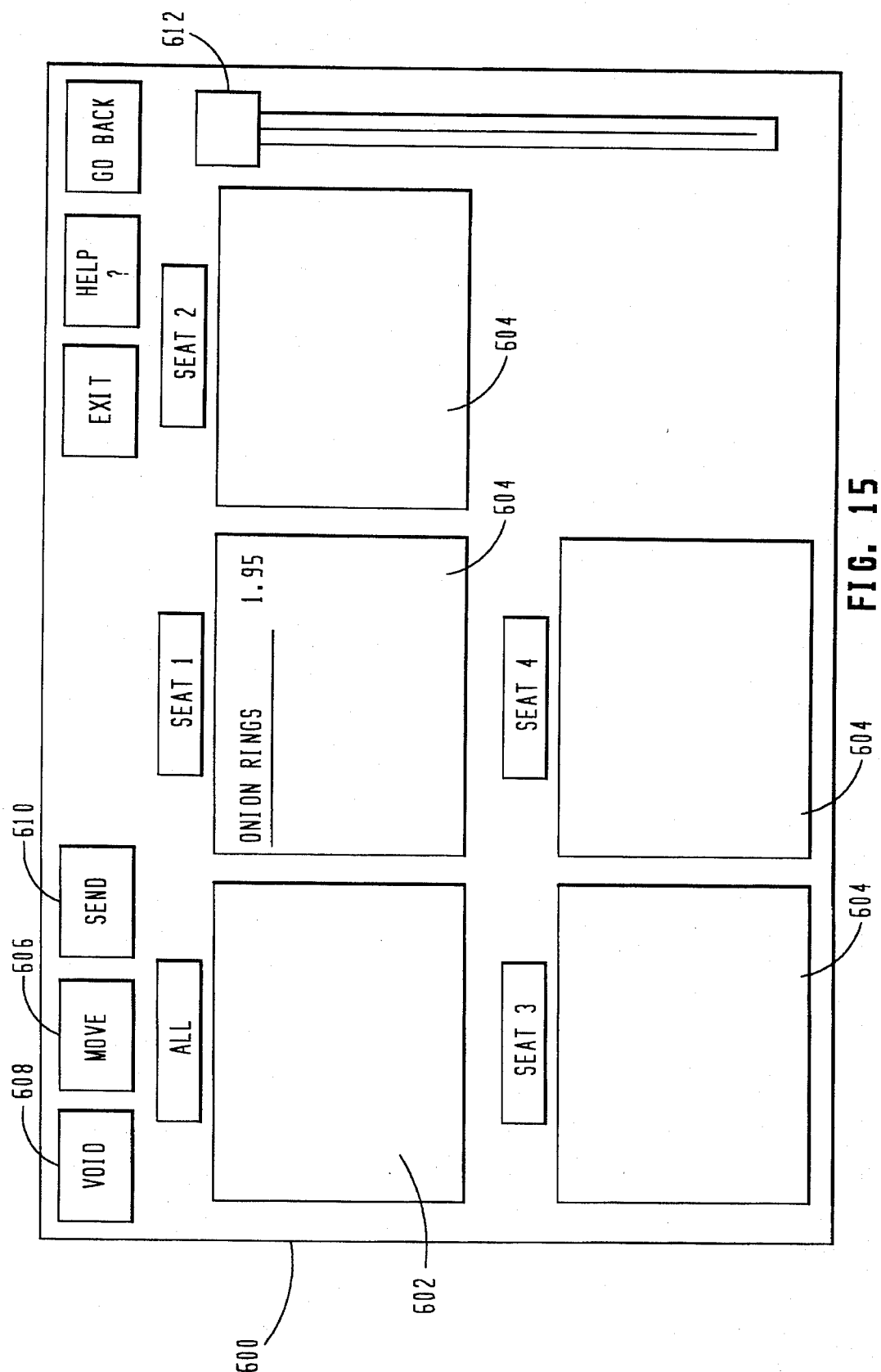
FIG. 15 illustrates a graphic representation of the view entire order screen which is accessed from the view entire order button from the menu screen.

Referring now to FIG. 15, there is illustrated a graphic representation of the view entire order screen which is accessed from the view entire order button 590 from the menu screen 550. The view all screen 600 is shown. The view all screen 600 contains an all ordered window 602 and seat ordered windows 604. Items ordered by the full table, such as a shared appetizer, will be displayed in the all ordered window 602. Items ordered by persons in each seat will be shown in the seat order window 604 corresponding to the seat number in which the person placing the order is seated. To move an order from either the all ordered window 602 or a seat ordered window 604, the server may highlight the item and press a move button 606 and then press the corresponding all ordered window 602 or seat ordered window 604 to where they wish to move the menu item. The screen also contains a void button 608 which may be pressed after an item is highlighted to void that item. The view all screen 600 also contains a send order button 610, such that once the server has viewed and manipulated the order, the order may be sent to the kitchen from this screen. A scroll bar 612 is provided so that the server may scroll through more windows than are available to fit on the view all screen 600.

Figure 16:
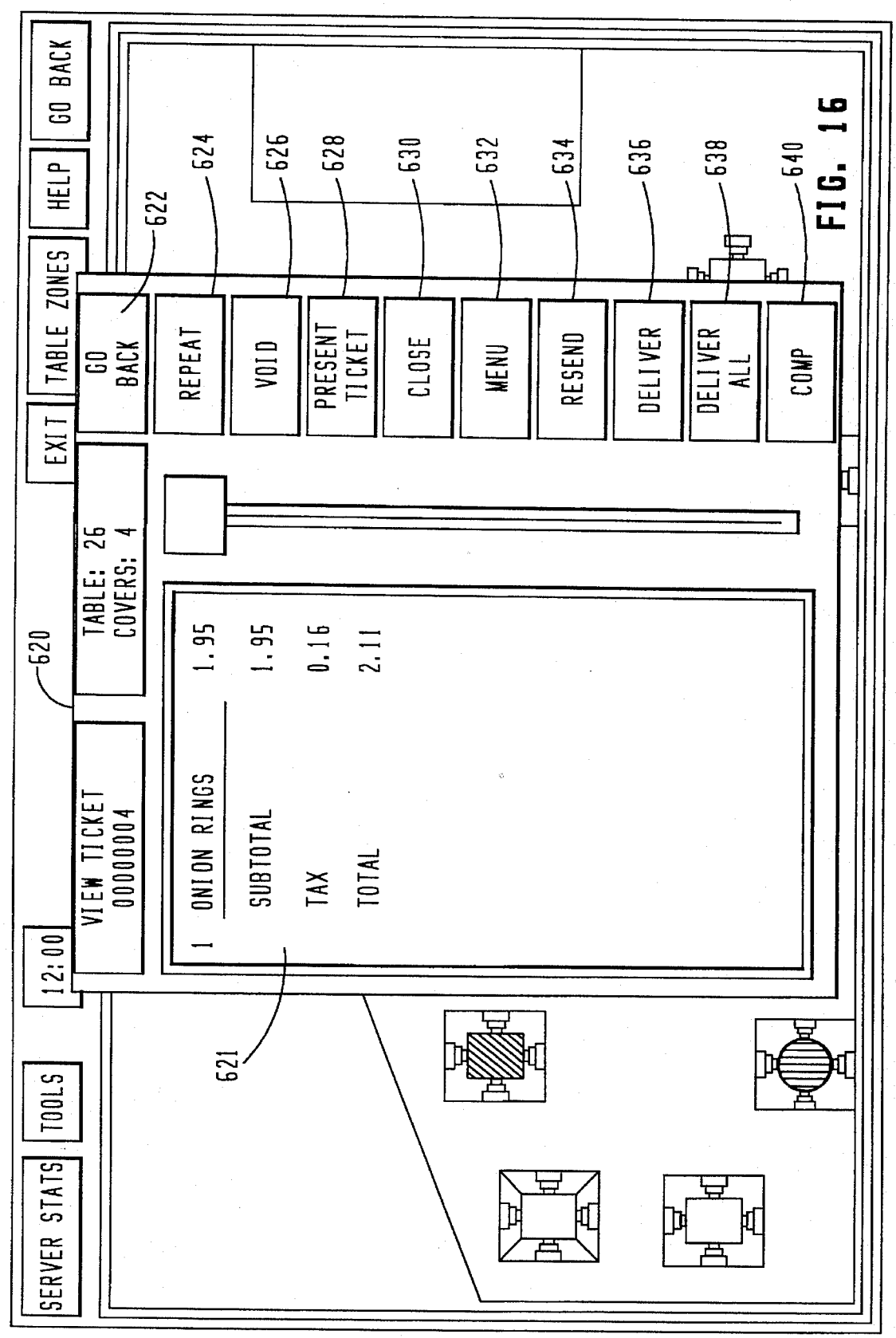
FIG. 16 illustrates the existing ticket view screen.

Referring now to FIG. 16, there is illustrated the existing ticket view screen 620. The existing ticket view screen 620 is pulled up when a table 306 is touched when at the table view screen 300 and the table 306 has an order which has already been sent. This table will show as a green table on the table view screen 300. A go back button 622 is provided allowing the user to go back to the table screen 300. A repeat button 624 is provided allowing the server to repeat an order, such as a round of drinks, if the person wishes to order another round. A void button 626 is provided such that a server may highlight an item shown in the view ticket window 621 and that item will be voided. A present ticket button 628 is provided. To present a ticket, the server presses this button and a ticket is presented as described above with respect to FIG. 13. A close button 630 is provided. The server may press the close button 630 when they wish to pay for the meal as described above with respect to FIG. 9. A menu button 632 is provided. When a server presses the menu button 632, the server is returned to the menu screen 550. If a server wishes to resend the order because of a lost ticket or another reason, the server would press a resend button 634. When all or part of an order is ready to be delivered as indicated by a fill color shown on the table screen 300, the server may highlight the items ready to be delivered in the ticket view screen 621 and press a deliver button 636. The items which are ready to be delivered, those items that caused the time to be exceeded and the table fill color to change, will blink on the list. If the server wishes to deliver all of the items shown in the view ticket window 621, the server would press a deliver all button 638. If the server wishes to discount or give a complementary item to a patron, the server would press a comp button 640 to pull up a comp screen, such that an item can be discounted by price or by percentage.

In summary, there has been provided a point of sale system to provide full hospitality management operations.

Although the preferred embodiment has been described in detail, it should be understood that various changes, substitutions and alterations can be made therein without departing from the spirit and scope of the invention as defined by the appended claims.

What is claimed is:

1. A restaurant management system, comprising:

an inventory system for containing restaurant items that can be delivered to a customer, each of said restaurant items having a unique preparation time associated therewith;

an order system for receiving an order from a customer and generated thereby to define desired ones of said restaurant items for supply to the customer, each of said orders defining a predetermined number of desired ones of said restaurant items for delivery to the ordering one of the customers;

a supply system for supplying said desired restaurant items to the one of said customers generating said order;

said order system operable to generate said orders, each with delivery time information associated with each of said associated desired restaurant items to define the relative time of delivery of each of said desired restaurant items relative to a given order to the ordering one of the customers;

a supply control system for controlling the time that said supply system retrieves said desired items from said inventory system for preparation thereof and the subsequent supply of the prepared restaurant items to each of said customers associated with a given one of said orders and in accordance with both said delivery time information associated with each of said given one of said orders and said preparation time for the associated restaurant items, wherein said supply control system determines the supply time; and a remuneration system for collecting money for said desired items for a given one of said orders from the one of said customers associated with said given order.

2. The restaurant management system of claim 1, wherein select ones of said desired items have an inherent minimum time associated therewith such that said supply system cannot supply said desired items having said associated inherent minimum time until the period of time from the receipt of said order by said order system to the time of supply by said supply system exceeds said inherent minimum time.

3. The restaurant management system of claim 2, wherein said select ones of said restaurant items have a minimum time and a maximum time between which said restaurant item can be supplied by said supply system.

4. The restaurant management system of claim 2, wherein said minimum time can be altered.

5. The restaurant management system of claim 1, wherein said remuneration system is operable to collect money in response to the receipt of an order by said order system and prior to said supply system initiating any supply operation of any of said desired items.

6. The restaurant management system of claim 1, and further comprising a monitoring system for monitoring said order system and said supply system to ensure that said order system and said supply system are operating correctly and that said supply system is supplying the desired items in accordance with orders received by said order system and the time information associated therewith.

7. The restaurant management system of claim 6, and further comprising an alarm system having a plurality of threshold alarms, wherein at least one of said threshold alarms has a first duration substantially equal to said time information associated with said order, said at least one threshold alarm generating a first response signal when said first duration is exceeded and said desired restaurant items are not supplied by said supply system, said remaining threshold alarms having time durations associated therewith that are referenced to the generation of said first response signal.

8. The restaurant management system of claim 6, and further comprising a display for displaying a representation of all customers and a status system for displaying status information for each of said displayed customer representations indicating the status of said order associated with said associated customers.

9. The restaurant management system of claim 8, wherein each of said customers is associated with a display icon such that a plurality of customers can be associated with a single one of said display icons, each of said display icons representing a table.

10. The restaurant management system of claim 9, wherein each of said display icons has associated therewith multiple display modes, each of said display modes representing a predetermined condition about an order generated by any of said customers associated with said display icon, said predetermined condition associated with said time information.

\* \* \* \* \*